US008400352B2

(12) United States Patent
Fenton

(10) Patent No.: US 8,400,352 B2
(45) Date of Patent: Mar. 19, 2013

(54) CENTIMETER POSITIONING USING LOW COST SINGLE FREQUENCY GNSS RECEIVERS

(75) Inventor: Patrick C. Fenton, Calgary (CA)

(73) Assignee: NovAtel Inc., Calgary (CA)

( * ) Notice: Subject to any disclaimer, the term of this patent is extended or adjusted under 35 U.S.C. 154(b) by 198 days.

(21) Appl. No.: 12/917,625

(22) Filed: Nov. 2, 2010

(65) Prior Publication Data
US 2011/0102254 A1    May 5, 2011

Related U.S. Application Data

(60) Provisional application No. 61/257,492, filed on Nov. 3, 2009.

(51) Int. Cl.
*G01S 19/44* (2010.01)
*G01S 19/43* (2010.01)

(52) U.S. Cl. ............................. 342/357.27; 342/357.26

(58) Field of Classification Search ............ 342/357.21, 342/357.26, 357.27, 357.4; 701/470, 477
See application file for complete search history.

(56) References Cited

U.S. PATENT DOCUMENTS

| | | | | |
|---|---|---|---|---|
| 5,359,332 | A * | 10/1994 | Allison et al. ........... | 342/357.42 |
| 5,663,734 | A | 9/1997 | Krasner | |
| 6,127,968 | A | 10/2000 | Lu | |
| 6,469,663 | B1 * | 10/2002 | Whitehead et al. ...... | 342/357.31 |
| 2003/0058163 | A1 | 3/2003 | Zimmerman et al. | |
| 2009/0135057 | A1 | 5/2009 | Vollath et al. | |
| 2012/0146847 | A1 * | 6/2012 | Janky et al. ............. | 342/357.23 |

OTHER PUBLICATIONS

Teunissen, P.J.G., "Least-Squares Estimation of the Integer GPS Ambiguities", Section IV "Theory and Methodology", at the General Meeting of the International Association of Geodesy, Beijing, China, Aug. 1993, pp. 1-16.
de Jonge, Paul J. et al., "Epoch-by-Epoch Positioning and Navigation", ION GPS 2000, Sep. 19-22, 2000, Salt Lake City, UT, pp. 337-342.
Teunissen, P.J.G., "The Least-Squares Ambiguity Decorrelation Adjustment: A Method for Fast GPS Integer Ambiguity Estimation", Journal of Geodesy (1995) pp. 65-82.
Teunissen, P.J.G., "A New Method for Fast Carrier Phase Ambiguity Estimation", presented at IEEE PLANS 1994, Las Vegas, NV, Apr. 11-15, 1994, pp. 562-573.
Moeglein, Mark et al., "An Introduction to SnapTrack Server-Aided GPS Technology", ION GPS—98, Sep. 15-18, 1998, pp. 333-342.

* cited by examiner

*Primary Examiner* — Dao Phan
(74) *Attorney, Agent, or Firm* — Cesari and McKenna, LLP; Patricia A. Sheehan

(57) ABSTRACT

A global positioning system includes a base GNSS receiver that determines position and carrier phase measurements for GNSS satellites in view and a rover GNSS receiver, which is a single frequency receiver that captures GNSS satellite signals transmitted in the single frequency band during a capture window from a plurality of GNSS satellites, the plurality being large enough to provide a carrier phase data set from which a solution to associated integer carrier phase ambiguities is over determined. The system determining from the captured signals, a search space associated with the satellites in view, the code phase delays and associated position uncertainty. The system resolving the integer carrier cycle ambiguities using double difference carrier phase measurements associated with signal power values that are over a predetermined threshold value. The system resolving the carrier cycle ambiguities over the capture window to a single solution set and determining the position of the rover GNSS receiver to an accuracy within centimeters using the resolved carrier phase measurements.

23 Claims, 2 Drawing Sheets

CENTIMETER POSITIONING USING LOW COST SINGLE FREQUENCY GNSS RECEIVERS

CROSS-REFERENCE TO RELATED APPLICATIONS

The present application claims the benefit of U.S. Provisional Patent Application Ser. No. 61/257,492, which was filed on Nov. 3, 2009, by Patrick C. Fenton for a CENTIMETER POSITIONING USING LOW COST SINGLE FREQUENCY GNSS RECEIVER and is hereby incorporated by reference.

FIELD OF THE INVENTION

The invention relates generally to GNSS receivers and, more particularly to low cost single frequency GNSS receivers.

BACKGROUND INFORMATION

Low cost single-frequency GNSS receivers, such as those utilized in cellular telephones, PDAs and other consumer devices, generally provide global positions that are accurate within ten meters or so. The ten meter accuracy is acceptable for the types of applications for which these devices commonly use positions, such as, for example, directions to local restaurants, determining where friends are in the vicinity, navigating to landmarks of interest, and so forth.

The low cost single-frequency GNSS receivers typically receive tracking assistance from cellular telephone base station GNSS receivers in the form of information relating to satellites in view, associated Doppler offset and, as appropriate, satellite navigation data. The tracking assistance information allows the receiver to more easily acquire the satellite signals, by eliminating much of the satellite signal search processing that the receiver would otherwise have to perform. The receiver can thus acquire the satellite signals more quickly and also acquire weaker satellite signals and/or signals that may be affected by multipath. In this way, the receiver is more likely to acquire the minimum number of satellite signals required to determine position. The receiver may thus determine positions to an accuracy within tens of meters when, for example, the receiver is indoors or in other locations, such as urban canyons, and so forth, in which certain satellite signals may otherwise be unavailable.

The GNSS satellite signals contain PRN codes that are utilized for determining position. Generally, before the receiver determines its position, the receiver tracks the PRN codes in the signals from at least 4 GNSS satellites. The PRN code tracking is performed by synchronizing a locally generated version of a transmitted PRN code with the received version of the code. The synchronization of the local and received PRN codes takes time, even when tracking assistance information is utilized.

Once a receiver is tracking a PRN code on a given satellite signal, the receiver can determine the transit time of the code from the satellite to the receiver based on the code phase delay of the locally generated code, that is, based on the delay in the locally generated code from the known transmission time. The receiver can then determine its pseudorange to the satellite in a known manner, and calculate its position in a known manner based on the pseudoranges from at least four GNSS satellites. Alternatively, the receiver may send the pseudoranges to the base station, which calculates the position of the receiver.

Other methods of pseudorange determination involve convolutions performed through FFT processing. In a known prior system, a received signal is pre-processed by averaging over PRN code epochs and then analyzed by FFT processing to determine the PRN code phase delays for the PRN codes associated with the satellites in view. The code phase delay information is further processed to determine the associated pseudoranges. The receiver or the base station, as appropriate, then determines the position of the receiver based on the pseudoranges. The end result, using either the correlation or convolution processing methods, is a position with an accuracy of tens of meters or so determined from the pseudoranges.

To save battery power at the receiver, a known prior system records the received satellite signal for a second or so and powers down its radio frequency (R/F) front end. The receiver then pre-processes the recorded signals by averaging the signals over the PRN code epochs and so forth as discussed above, and determines the code phase delays associated with the respective satellite signals. The receiver thus determines the code phase delays associated with the respective satellite signals based on the FFT processing of the pre-processed satellite signals along with the PRN codes and the associated Doppler offsets provided by the base station. The rover then calculates pseudoranges to the satellites and provides the pseudoranges to the base station, which determines the position of the receiver to within the tens of meters accuracy.

For positions that are more accurate than tens of meters, more complex and thus, more expensive GNSS receivers are utilized that have greater processing power and use multipath mitigation techniques. These receivers may also have the capability to track dual frequencies, have wider RF band front ends, and/or utilize carrier phase information to determine positions. In order to utilize the carrier phase information, however, integer carrier cycle ambiguities must first be resolved.

With dual frequencies, the receivers use known wide-lane techniques to limit the possible ambiguity solutions, to allow the ambiguity resolution to occur in less time because the calculations need to check fewer possible solutions. Using wide-lane techniques with L1 and L2 GPS satellite signals, the receiver tests possible solutions that are 86 centimeters apart as opposed to 19 centimeters apart for single frequency GPS L1 ambiguity resolution. Further, with dual frequencies, uncertainties relating to the adverse effects of the ionosphere and so forth on the satellite signals are reduced. Thus, the wide-lane dual frequency techniques for ambiguity resolution provide the integer carrier cycle value in much less time and/or after much less processing than can single frequency receivers.

The resolution of the carrier cycle ambiguities using the wide-lane techniques, like the known single frequency techniques, requires that the GNSS receivers continuously track the satellite signal PRN codes and carriers, and thus, that the R/F front end continuously operate, for relatively long periods of time to track the signals, for example, for 20 or more minutes. If during this time the GNSS receiver loses lock to a GNSS satellite signal, the receiver must start again to continuously track the satellites and perform the calculations necessary to resolve the associated integer carrier cycle ambiguities before the carrier phase information can be used to calculate position.

Accordingly, the more complex and/or dual-frequency GNSS receivers are not well suited for use in, for example, cellular telephones or PDAs, which have limited available battery power, even if the cost of the receivers were not prohibitive for that use.

SUMMARY OF THE INVENTION

A system for determining position to within an accuracy centimeters using low cost single frequency GNSS receivers ("Rovers") includes one or more base stations with base GNSS receivers that alone or together have a clear view of the sky. The base stations communicate with one or more Rovers, such as, for example, the single frequency GNSS receivers built into cellular telephones. A Rover captures, or retains, GNSS satellite signals received over a relatively short time i.e., within a capture window of, for example, 1 second. The window need only be sufficiently long to produce, after analog-to-digital processing, an appropriate number of signal samples from which code phase delays, carrier phase measurements and signal power estimates can be determined. Once the digital signal samples are produced for the capture window, the Rover may power down the R/F front end to conserve battery power. Alternatively, the Rover may power down the R/F front end after the satellite signals have been captured and before the signals are processed. The processing may then take place at a later time to, for example, provide a position with an accuracy of centimeters to document an event or a photograph recorded by a cell phone or PDA that houses the Rover.

A processor in the Rover or, for example, in the base station to which the Rover sends the samples, processes the samples along with the PRN codes from the plurality of GNSS satellites in view, for example, from ten or more satellites, and determines the code phase delays, carrier phase measurements and signal power measurements. As appropriate, the Rover sends the code phase delays or corresponding pseudo-ranges, carrier phase measurements and power values to the base station for further processing.

The base station processes the code phase delays and carrier phase measurements associated with signal power estimates above a predetermined threshold to determine a search space for integer carrier cycle ambiguity resolution. The search space may be, for example, one in which the geometries of the satellites in view are orthogonal to one another and a search sphere within the space is based also on associated position uncertainties.

To remove clock errors from the carrier phase measurements, a processor at the base station differences the carrier phase measurements received from the Rover with the corresponding carrier phase measurements from the one or more base GNSS receivers and further differences the measurements across satellites, to produce carrier phase double difference measurements. The processor then processes the carrier phase double difference measurements to determine all possible combinations of integer ambiguity solutions within the applicable search sphere within the search space, and resolves the integer carrier cycle ambiguities by identifying the correct set of ambiguity solutions. Based on the solutions, the base station then provides the rover position with an accuracy of centimeters based on the carrier phase measurements.

The base station thus resolves the integer carrier cycle ambiguities over the single measurement, or capture, window based on the carrier phase double differences associated with a sufficiently large number of satellites to over determine the solution, without requiring continuous tracking of the satellites or the use of dual frequencies.

BRIEF DESCRIPTION OF THE DRAWINGS

The invention description below refers to the accompanying drawings, of which.

DETAILED DESCRIPTION OF AN ILLUSTRATIVE EMBODIMENT

The embodiment described below utilizes low cost single frequency GNSS receivers (hereinafter "Rovers") of the type that may be incorporated into cellular telephones or PDAs. The Rovers may instead be stand alone receivers or be incorporated into other communication devices. The Rovers may, but need not, receive tracking assistance information in the form of a listing of satellites in view and associated Doppler offsets. The example described first below utilizes tracking assistance. Other examples are also described that do not utilize tracking assistance.

Figure 1:
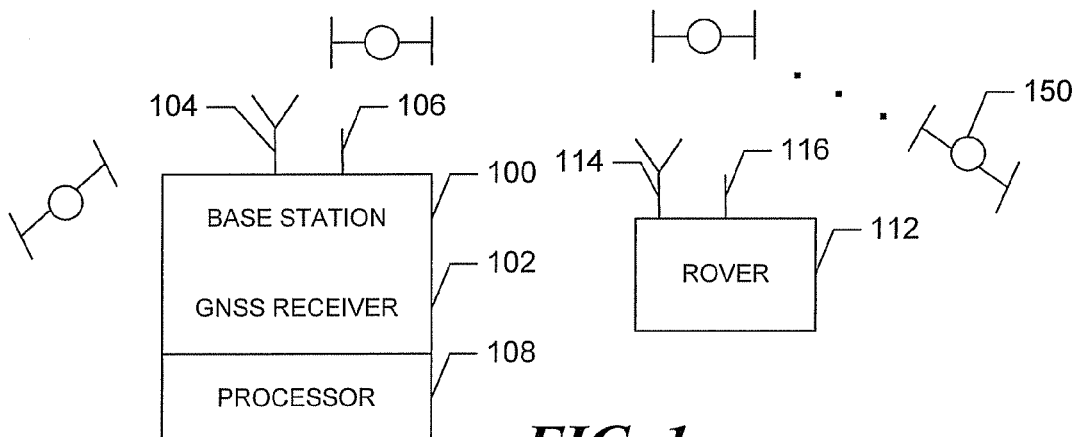
FIG. 1 is a functional block diagram of a system constructed in accordance with the invention.

Referring to FIG. 1, a base station 100 includes a base GNSS receiver 102 that receives, over a GNSS antenna 104, GNSS signals transmitted by GNSS satellites 150. The GNSS receiver operates in a known manner to acquire and track signals from the GNSS satellites in view, determine associated Doppler frequencies and calculate a global position. The GNSS antenna 104 has an essentially clear view of the sky and receives line-of-sight signals from all of the satellites in view. The satellites in view may all be from one satellite constellation or may be from a number of different satellite constellations, such as GPS, Galileo, Compass, GLONAS, and so forth. In the example, the base GNSS receiver receives signals from at least ten GNSS satellites.

One or more Rovers 112 receives satellite signals over GNSS antennas 114. In the example, the Rovers process signals received over a frequency band of 1575.42 MHz+/−2 MHZ that includes the L1 GPS signals, E1 Galileo signals, C1 Compass signals and so forth that are transmitted in the frequency band. As appropriate, the Rovers may further or instead process signals from a frequency band that includes signals from GLONAS satellites, as discussed below.

In the example, the base station 100 further includes an antenna 106 which is used to broadcast tracking assistance information that includes a list of the satellites in view, the associated Doppler frequencies, the current time, and so forth. The base station may be, for example, a cellular telephone base station, and the broadcast may be at the cellular telephone transmission frequency of 600 MHz The Rovers 112 receive the broadcast tracking assistance information over antennas 116, which may be, for example, whip antennas and/or antennas designed to receive cellular telephone transmissions. A given Rover may be incorporated into a cellular telephone and utilize the telephone radio frequency (R/F) signal processing circuitry (not shown) in a known manner to process the tracking assistance information. Alternatively, the rover may include a dedicated signal processor 120 that processes the tracking assistance information. The tracking assistance information is utilized at the Rover by a PRN code generator 130, which generates local versions of the PRN codes that are transmitted by the GNSS satellites on the single frequency band over which the rover operates.

The Rover 112 captures, that is, retains in a memory 134, the GNSS signals received over a very short duration capture window. The window need only be long enough to produce, after analog to digital processing, an appropriate number of signal samples to provide sufficient signal processing gain to produce a signal-to-noise ratio that is adequate to provide the required measurement accuracy. In the example the capture window is 1 second long. As discussed in more detail below, there are tradeoffs in the size of the window versus processing and/or requirements. The length of the capture window may, for applications in which the Rover is expected to be in locations with clear views of the sky, be shorter, such as, for example, 1 millisecond, or one GPS L1 PRN code epoch.

The Rover 112 uses the received tracking assistance information to determine the satellites then in view and also the offsets required for the associated Doppler frequencies. The Rover then processes the captured signals along with the associated offset PRN codes in a known manner to determine respective code phase delays, signal power values and carrier phase measurements for each of the satellites in view. As appropriate, the Rover also calculates pseudoranges based on the code phase delays.

The Rover then transmits the pseudoranges, power values and carrier phase measurements back to the base station 100, using the antenna 116. Alternatively, the rover transmits the code phase delays rather than the pseudoranges, and thus, the rover need not calculate the pseudoranges. If the rover is incorporated into a cellular telephone, the rover utilizes the cellular telephone circuitry to transmit the information back to the base station. Otherwise, the rover incorporates a transceiver (not shown) that can both transmit signals to and receive signals from the base station.

The base station 100 processes in a processor 108 the received code phase delays or pseudoranges, and the carrier phase measurements to determine the position of the Rover 112. More specifically, the processor double differences the carrier phase measurements, that is, calculates the differences between corresponding carrier phase measurements at the Rover and base GNSS receiver as well as the differences in the measurements across satellites, to eliminate clock errors from the measurements. The processor next resolves the associated integer carrier cycle ambiguity by processing the double difference carrier phase measurements corresponding to the capture window in an appropriate search space, as described in more detail below. Then, based on the carrier phase measurements and the pseudoranges, the base station determines the position of the Rover to an accuracy of within 1 or a small number of centimeters, all without having to continuously track the GNSS satellite signals at the Rover, as is required using known prior systems. Thus, a Rover, that is, a low cost single frequency GNSS receiver, incorporated into, for example, a cellular telephone or a PDA, can be used to determine global position to within an accuracy of centimeters.

Figure 2:
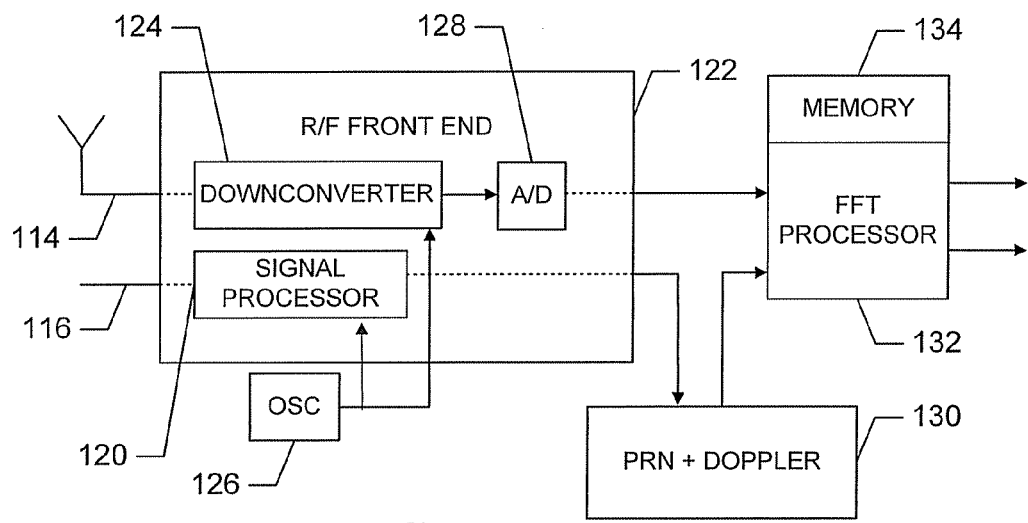
FIG. 2 is a functional block diagram of a rover that is part of the system of FIG. 1.

Referring now also to FIG. 2, the processing operations performed by the Rover 112 for signals received over a capture window will be discussed in more detail. The rover has a GNSS R/F front end 122 that includes a downconverter 124 and an analog-to-digital (A/D) converter 128. The downconverter operates in a known manner to downconvert the GNSS satellite signals received over antenna 114 in accordance with the signals from an oscillator 126, to produce intermediate frequency or base band signals. The A/D converter 128 samples the intermediate frequency signals and digitizes the samples to produce corresponding inphase (I) and quadrature (Q) samples. The samples are then provided to the memory 134. The R/F front end may also process the tracking assistance information received over the antenna 116 in a known manner, using the downconverter 124 and A/D converter 128, as appropriate, and the signal processor 120, to produce corresponding signals that are used by the PRN code generator 130.

If the rover is incorporated into a cellular telephone, the cellular telephone R/F front end processes the received tracking assistance information to produce the signals for the PRN code generator. The cellular telephone R/F front end may also process the GNSS satellite signals, to produce the I and Q samples.

The tracking assistance signals are used by the PRN code generator 130 to produce, for the respective GNSS satellite in view, locally generated PRN codes that are offset for Doppler. The PRN code generator thus uses the satellite identification and Doppler frequency information provided by the base station 100 as part of the tracking assistance information, to determine which PRN codes to produce and also the appropriate Doppler offsets for the respective codes. The locally generated (offset) PRN codes are provided to an FFT processor 132 along with the I and Q samples produced by the A/D converter 128.

Figure 3:
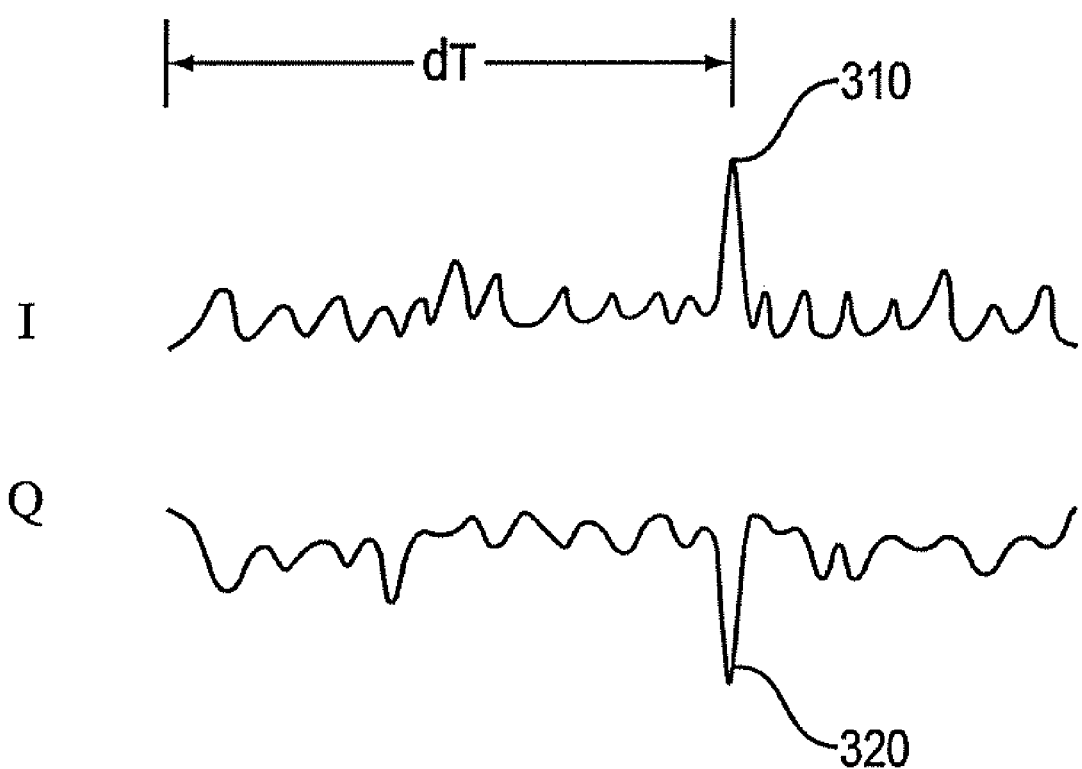
FIG. 3 is a graph of I and Q correlation signals produced by the FFT processor of the system of FIG. 1.

Referring also to FIG. 3, in the well known manner, the FFT processor 132 convolves the FFT of the locally generated PRN codes with the FFT of the captured signal samples and takes the inverse FFT of the convolution and determines from the results of the inverse FFT, for each PRN code over the capture window, both a code phase delay dT and a carrier phase measurement, that is, a carrier phase angle $\theta$=arctan (I/Q). The convolution essentially simultaneously tests various code phase delays of a given locally generated PRN code against the same PRN code in the captured signal. The FFT processor identifies the code phase delay, dT, that corresponds to the received code by determining the code phase delay that is associated with a coinciding maximum I correlation value (denoted by reference numeral 310 in the drawing) and maximum Q correlation value (denoted by reference numeral 320 in the drawing.

The Rover 112 also determines a frequency offset, or associated clock error, for the oscillator 126. Changes in ambient conditions, such as changes in the temperature of the cell phone that houses the Rover, affect the frequency offset for the low cost oscillators typically utilized in the Rovers. For example, the temperature of the cell phone may be cooler when the cell phone is in an outside coat pocket than when the cell phone is held in warm hands for a period of time, and such changes in the ambient conditions at the Rover result in changing the frequency offset of the oscillator. To determine the frequency offset, the Rover samples the power of the maximum I and Q code delay correlations with various estimates of oscillator error and selects the frequency offset that provides the maximum power output value. The frequency offset will be common across all of the satellites for which signals are being processed during the same sample set, i.e., over the same capture window, and will be highly correlated to samples that are collected within a short period of time. Accordingly, the numbers of estimates of the oscillator errors required to calculate the oscillator frequency offset in successive capture windows will be minimized.

The Rover 112 thus produces locally generated PRN codes that are offset for both Doppler and the oscillator frequency error. The Rover 112 next, in a known manner, determines its pseudorange from the GNSS satellite that transmitted the PRN code based on the identified code phase delay. The rover further calculates an associated power value $I^2+Q^2$ and determines if the power value is greater than a predetermined threshold, which signifies that the correlation peak is associated with line-of-sight signals as opposed to multipath signals.

The threshold is set above a level that is associated with noise, to keep carrier phase data values associated with reflected signals, such as multipath signals, out of the carrier phase data set that is processed to determine position to an accuracy within centimeters. There is a tradeoff in setting the threshold, since a higher threshold reduces the number of observations in the carrier phase data set that is utilized to over determine the ambiguity solution, while a lower threshold includes in the data set more reflected signal data that introduce positioning errors. Accordingly, the threshold is set above the noise such that the corrupted carrier phase data that is included in the data set is most likely removed through residual outlier testing, assuming a sufficiently large number of line-of-sight observations are included in the capture window and available for processing.

If the power value exceeds the threshold, the Rover 112 transmits to the base station 100 the pseudorange, the carrier phase measurement, or angle θ, and the power value. Alternatively, the rover may provide the code phase delay, dT directly to the base station, without determining the corresponding pseudorange. The rover performs the same computations using the PRN codes transmitted by the remaining GNSS satellites in view, and provides to the base station the associated pseudoranges or alternatively code phase delays, carrier phase angles and power values. If the power value is below the threshold, the rover does not further process or otherwise use the associated code phase delay and/or carrier phase measurements.

Figure 4:
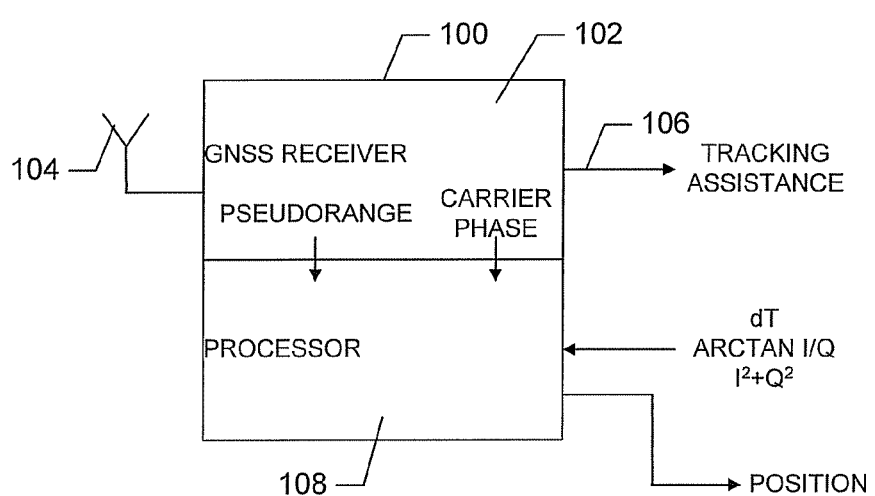
FIG. 4 is a functional block diagram of a base station that is part of the system of FIG. 1.

Referring now to FIG. 4, the operations of the base station 100 are explained in more detail. The base station GNSS receiver 102 operates in a known manner to track the PRN codes and carriers of the signals transmitted by the satellites in view, determine the associated Doppler offsets, and calculate its global position, based on the GNSS signals received over GNSS antenna 114. The base station then broadcasts a list of the satellites in view, their associated Doppler offsets, and so forth, as tracking assistance information over the antenna 106. If, for example, the rovers are incorporated into cellular telephones, the tracking assistance information is broadcast on the cellular telephone frequency of 600 MHz.

The GNSS receiver 102 provides to the processor 108 the carrier phase measurements for each of the satellite signals. The processor 108 also receives information from the Rover 112 over the antenna 106. The processor thus receives, for each of the satellites in view in the capture window, associated pseudoranges or code phase delay information dT, carrier phase measurements θ and power measurements that are determined to be over the predetermined threshold. As discussed above, the capture window is short, in the example, 1 second, and the code phase delays and carrier phase measurements are provided to the base station for each line-of-sight satellite signal present in the capture window.

The processor 108 processes the base station and rover carrier phase measurements corresponding to a given capture window to resolve the integer carrier cycle ambiguity. Since the Rover is only acquiring data from a single GNSS frequency band, e.g., the L1 frequency band, the processor has to resolve the integer ambiguities for a very large search space, on the order of $10\,m^3$, with the short wave length of the carrier frequency, in the example, 19 cm, which produces a very large number of possible solutions. As discussed, the system utilizes measurements from a relatively large number of GNSS satellites in view, in the example, ten satellites, to provide sufficient information from which to determine the solution, that is, to determine a single solution to the set of ambiguities (one for each double differenced satellite pair) over the capture window.

To resolve the carrier phase based cm level position the system uses over the capture window a known RTK (Real Time Kinematic) process that is utilized in prior systems that continuously track the satellite signals. The process is described briefly below.

To resolve the integer carrier cycle ambiguities relatively quickly, the processor 108 first calculates carrier phase double differences, that is, the processor differences the carrier phase measurements from the base station GNSS receiver and the rover across multiple satellites, to eliminate the adverse effects of clock errors. The processor then utilizes a Lamda or Z-transformation, which transforms the double difference carrier phase measurements from the capture window into measurements in a transformation space in which the geometries of the satellites in view are orthogonal to one another. See, for example, *A New Method For Fast Carrier Phase Ambiguity Estimation*, P. J. G. Teunissen, IEEE PLANS '94, April 1994, pp. 562-573. The processor 108 then resolves the carrier cycle ambiguities in the transformation space based on associated position uncertainties.

Based on the orthogonal geometries of the satellites in the transformation space, there are fewer unknown dimensions involved in resolving the integer carrier cycle ambiguity. Accordingly, using the double difference carrier phase measurements associated with the relatively large number of satellites, in the example, ten satellites, the solution in the Z transformation space is over determined, and the processor can ascertain when the ambiguity is correctly resolved in the transformation space based on the behavior of the corresponding residuals. When the ambiguities are correctly resolved, the residuals from the process are within the Rover's expected carrier phase measurement noise, that is, the residuals are within a selected statistical probability of being zero, and all other integer ambiguity combinations within the search space produce residual sets that are non-zero, that is beyond the selected statistical probability of being zero based on the expected measurement noise. With relatively few satellites there may be many combinations of ambiguity choices in which the residuals are close to zero but as the number of observations increases the number of possible integer combinations decreases dramatically. The integer carrier cycle ambiguity is thus resolved relatively quickly over a given capture window in which a relatively large number of satellites are in view, for example, 10 satellites. The statistical probability may be selected as 99%, which is a tradeoff of required position accuracy versus number of satellites required to resolve the integer carrier cycle ambiguities.

Once the ambiguity is resolved, the processor transforms the solution back to correspond to the actual satellite geometries, to provide the integer carrier cycle information for the GNSS satellite signals. With the carrier cycle ambiguities resolved, the processor determines the global position of the rover in a known manner using the resolved carrier phase measurements. The global position is thus determined to an accuracy within centimeters based on the single-frequency GNSS satellite signals received over the short time period of the capture window, without requiring the rover to continuously track the GNSS satellites. The system may perform the same calculation for a next capture window, and so forth, as appropriate, for example, when the rover is moving.

To save battery power at the rover, the GNSS R/F front end 122 is turned off once the GNSS signals in the short capture window have been processed into the digital I and Q signal samples. The rover then operates the FFT processor 132 to produce the carrier and code information that is provided to the base station 100. Operating the processor requires far less battery power than operating the R/F front end to receive and sample the GNSS signals, and thus, the system described herein is fully compatible with existing cellular telephone and PDA technology that has limited available battery power.

The FFT processor 132 may operate using the digital signal samples of the captured GNSS signals and the PRN code plus Doppler offset plus oscillator frequency offset signals produced in response to the satellites in view in the capture window and the previous oscillator frequency, or clock, offset estimates. Alternatively, the locally generated PRN codes may be pre-processed through the FFT processor, such that the Doppler shifts and oscillator clock offsets can then be added into the further processing of the locally generated PRN codes of the satellites in view in the capture window, and the results convolved with FFT of the received signal samples.

The Rover may transmit the captured signals for both sampling and FFT processing to the base station 100, or alternatively, the Rover may process the captured signals and transmit I and Q signal samples to the base station for the FFT processing. While sending information for FFT processing to the base station requires the Rover to transmit more information to the base station, the tradeoff is less processing occurs at the rover. The rovers are preferably on a somewhat short baseline, e.g. 10 kilometers, from the base station 100, to avoid problems of different ionosphere and troposphere conditions at the two receivers. Any number of the GNSS satellite signals in the capture window may instead be line-of-sight pseudolite signals, with the PRN code generator generating the associated pseudolite PRN codes and the base station GNSS receiver also processing the pseudolite signals.

Alternatively, the base station may transmit its carrier phase measurements, pseudoranges, satellite broadcast information to the rovers along with the tracking assistance information, and the rovers could then compute their own centimeter positions. This would, however, require more processing capability at the rovers. More than one base GNSS receiver may be used, particularly if portions of the sky are blocked in various locations of the base GNSS receivers. If more than one base GNSS receiver is utilized, a selected one of the base stations associated with the GNSS receivers will receive from the other base GNSS receivers the information required for the processing to resolve the integer carrier cycle ambiguities. The base station may receive double difference values associated with the other base GNSS receivers or may instead receive the carrier phase measurements needed to calculate the double differences. Alternatively, a base station, such as a cellular telephone base station (not shown) may receive all of the information from the respective base GNSS receivers and the Rover, with processors in the base station then performing the calculations to resolve the integer carrier cycle ambiguities.

If the Rover is transmitting the captured signal information or the digital I and Q values to the base station for processing, there is no need for the base to transmit tracking assistance information to the Rover. Rather, the base station will have all of the information needed to process the captured satellite signals and determine the Rover position to within the accuracy of centimeters based on the calculation of the integer carrier cycle ambiguities.

The processors for performing the various operations to determine code phase delays, carrier phase measurements and, as appropriate, to resolve the integer carrier phase ambiguity may be located at the Rovers, at the base stations or certain of the processors may be located at the Rovers and others at the base stations. For example, processors at the Rovers may determine code phase delays, carrier phase measurements and position, and processors at the base stations determine the integer carrier phase ambiguities using the calculated code phase delays or pseudoranges, carrier phase delays and so forth determined at the Rovers. Alternatively, the base GNSS receivers and the Rovers may provide certain or all of the information to other locations where the data can be combined.

In the example the number of satellites required for ambiguity resolution is 10 or more. However, depending on the geometries of the satellites in view, for example, if the satellites are sufficiently spaced across the sky, fewer satellites, for example, 8 satellites may be utilized. Alternatively, if the satellites are not sufficiently spaced, more than 10 satellites may be required. To resolve the integer carrier cycle ambiguities, the number of satellites must be sufficient to provide information from which a single solution for the ambiguities can be determined over the capture window.

As appropriate, the captured signals may be processed into base band digital I and Q samples through the well known downconversion process. Further, the determination of code phase delays may be performed be testing different code phases and frequencies iteratively, as opposed to simultaneously.

If compatibility of satellite constellations is ensured by agreement or otherwise concerning broadcast frequency bands, clock synchronization and coordinate frame relationships, the system may utilize single frequency signals from the respective satellite constellations within the capture window. As discussed, the rovers need not track the satellite signals and the system may use the differences between the frequencies utilized in the respective satellite constellations to reduce the number of possible solutions using wide lane techniques that in prior systems require continuous tracking. If different satellite constellations are not compatible, for example, as GPS and Glonass are not compatible, the signals from both constellations may be utilized if sufficient numbers of satellites in each constellation are available to resolve clock uncertainties between the two constellations.

In systems in which the low cost single frequency Rovers are in fixed locations for a known period of time, for example, in survey applications, the system may resolve the integer carrier cycle ambiguities over a given capture window to within a small number of possible solutions. The system may then do the same for a relatively small number of capture windows and compare the solutions to determine a single solution. In such applications, signals from a smaller number of satellites may be required per capture window. However, for applications in which the user is, for example, walking and carrying the Rover, for example, carrying a cell phone or PDA equipped with the Rover, it is expected that a solution must be calculated over a single capture window. For either the static or moving application, however, continuous tracking of the satellite signals is not required.

In addition, for the applications in which the Rover is static or moving slowly in a defined pattern, such as the movement of a heavy boat or train, the integer ambiguities determined for a capture window may be checked against the ambiguities determined for other capture windows to ensure the correct solution was calculated. Since the system designer has set a probability threshold equal to or near 99% for the integer determination the system may determine if the solution calculated over a given capture window is correct by checking successive positions. If the system determines the computed positions with incorrect integers, the positions will differ from the correct ones by relatively large distances, which could be anywhere within the position uncertainties within the search space.

The size of the capture window is a tradeoff between process gain, with the bigger the window the more process gain, and hardware concerns such as amounts of RAM, CPU power, broadcast bandwith, if the samples are being transmitted to the base station, R/F radio on time, all of which tend to smaller window sizes. Further, with larger windows, the oscillator must be have more frequency stability and user motion would have to be restricted over the window. Accordingly, window sizes of 1 second or so are utilized. If the Rovers were to operate in positions with clear views of the sky and have reasonably good antennas, capture windows may be as small as 1 millisecond.

What is claimed is:

1. A method for determining global position, the method including the steps of:
   operating one or more rover GNSS receivers to capture line-of-sight GNSS satellite signals transmitted in a given single frequency band over a capture window from a plurality of satellites large enough to provide a carrier phase data set from which a solution to associated integer carrier phase ambiguities is over determined;
   processing samples of the satellites signals to determine code phase delays, carrier phase measurements and associated signal power;
   determining a search space in which to resolve the integer carrier cycle ambiguities based on the satellites in view, code phase delays and position uncertainty;
   resolving integer carrier cycle ambiguities using the carrier phase measurements and power measurements from the rover GNSS receiver and carrier phase measurements from one or more base GNSS receivers that alone or together have clear views of the sky, by manipulating carrier phase double difference measurements to identify a single set of solutions for the integer carrier cycle ambiguities over the capture window in the search space; and
   determining the position of the rover GNSS receiver to an accuracy within centimeters using resolved carrier phase measurements.

2. The method of claim 1, further including the rover GNSS receivers turning off radio front ends after capturing the satellite signals.

3. The method of claim 1, wherein the step of resolving integer carrier cycle ambiguities uses the code phase delay and carrier phase measurements corresponding to signals from 10 or more satellites in view.

4. The method of claim 1, wherein the capture window has a length of 1 second or less.

5. The method of claim 1 wherein the one or more rover GNSS receivers determine code phase delays, carrier phase measurements and signal power using tracking assistance information provided by the one or more base GNSS receivers.

6. The method of claim 1, wherein the code phase delays and carrier phase measurements that are utilized correspond to signal power values above a predetermined threshold.

7. The method of claim 1 further including a step of turning off a radio frequency front end of the rover GNSS receiver after the signals from the capture window have been processed to produce corresponding digital inphase and quadrature samples and the samples are transmitted to the processors.

8. The method of claim 1 wherein the search space is one in which the satellite geometries of the satellites in view are orthogonal.

9. The method of claim 5 wherein the rover GNSS receiver further determines pseudoranges and provides the pseudoranges to one or more of the base GNSS receivers.

10. The method of claim 1 wherein the step of determining code phase delays and carrier phase measurements includes
   convolving fast Fourier transforms (FFTs) of the captured signals and locally generated versions of the codes contained in the captured signals,
   taking inverse FFTs of the convolutions, and
   determining coinciding maximum I and Q correlation values.

11. The method of claim 1 further including using in the ambiguity resolution the carrier phase measurements associated with power values above a predetermined threshold.

12. The method of claim 1 wherein the rover GNSS receiver provides the captured signals to one or more of the base GNSS receivers for processing and turn off radio front ends.

13. A system for determining global position including:
   one or more base GNSS receivers that alone or together have a clear view of at least portions of the sky, the base GNSS receivers determining position and carrier phase measurements for satellites in view;
   a rover GNSS receiver for capturing during a capture window GNSS satellite signals transmitted in a given frequency band by a plurality of GNSS satellites in view, the plurality being large enough to provide a carrier phase data set from which a solution to associated integer carrier phase ambiguities is over determined,
   one or more processors for determining code phase delays, carrier phase measurements and signal power values for the captured GNSS satellite signals,
   the one or more processors resolving integer carrier cycle ambiguities using the code phase delays, carrier phase measurements and signal power values from the rover GNSS receiver and the position and carrier phase measurements from base GNSS receiver by manipulating double difference carrier phase measurements over a search space determined for the satellites in view, and based on code phase delays and associated position uncertainties at the rover GNSS receiver, and
   determining the position of the rover GNSS receiver to an accuracy within centimeters using resolved carrier phase measurements.

14. The system of claim 13, wherein the respective rover GNSS receivers turn off radio front ends after capturing the satellite signals.

15. The system of claim 13, wherein the one or more processors use the code phase delays and carrier phase measurements corresponding to signals from 10 or more satellites in view.

16. The system of claim 13, wherein the capture window is less than or equal to 1 second in length.

17. The system of claim 13, wherein the one or more bases stations provide tracking assistance information to the one or more processors that determine the code phase delays and carrier phase measurements for the rover GNSS receiver.

18. The system of claim 13 wherein the respective rover GNSS receivers turn off radio frequency front ends after the signals from the capture window have been processed to produce corresponding digital inphase and quadrature samples.

19. The system of claim 16 wherein certain of the one or more processors that determine code phase delay and carrier phase measurements are in the rover GNSS receivers, and others of the one or more processors that resolve integer carrier cycle ambiguities are in one or more base stations associated with the base GNSS receivers, and the rover GNSS receiver provides code phase delay and carrier measurement information to the one or more base stations.

20. The system of claim 19 wherein the processors in the rover GNSS receivers further determine pseudoranges and provide the pseudoranges to one or more of the base GNSS receivers as position information.

21. The system of claim 13 wherein the one or more processors determining code phase delays and carrier phase measurements by
    convolving FFTs of the captured signals and locally generated versions of the codes contained in the captured signals,
    taking inverse FFTs of the convolutions, and
    determining coinciding maximum I and Q correlation values.

22. The system of claim 13 wherein the one or more processors use in resolving the integer carrier cycle ambiguities the code phase delays and carrier phase measurements associated with signal power values above a predetermined threshold.

23. The system of claim 13 wherein the one or more processors are in one or more base stations associated with the base GNSS receivers and the rover GNSS receivers provide the captured signals to the base GNSS receivers for processing.

* * * * *